United States Patent [19]

Mainwaring et al.

[11] Patent Number: 5,281,339
[45] Date of Patent: Jan. 25, 1994

[54] REMOVAL OF CONTAMINANTS

[75] Inventors: David E. Mainwaring, North Melbourne; Ian H. Harding, Greensborough; Peter Sanciolo, Reservoir, all of Australia

[73] Assignee: ICI Australia Operations Proprietary Limited, Melbourne, Australia

[21] Appl. No.: 776,298

[22] PCT Filed: Jun. 7, 1990

[86] PCT No.: PCT/AU90/00250

§ 371 Date: Dec. 6, 1991

§ 102(e) Date: Dec. 6, 1991

[87] PCT Pub. No.: WO90/15024

PCT Pub. Date: Dec. 13, 1990

[51] Int. Cl.⁵ .................................... C02F 1/24
[52] U.S. Cl. .................... 210/705; 210/704; 210/717; 210/725; 210/728; 210/912; 210/913; 210/914
[58] Field of Search .................... 210/703–707, 210/716, 717, 725, 727, 728, 912–914

[56] References Cited

U.S. PATENT DOCUMENTS

| | | | |
|---|---|---|---|
| 3,053,761 | 9/1962 | Bradt | 210/704 |
| 3,203,968 | 8/1965 | Sebba | 210/912 |
| 3,764,013 | 10/1973 | Eisenmann | 210/705 |
| 3,886,068 | 5/1975 | Eron | 210/704 |
| 4,203,837 | 5/1980 | Hoge et al. | 209/166 |
| 4,219,416 | 8/1980 | Ramirez et al. | 210/707 |
| 4,844,873 | 7/1989 | Lebon et al. | 210/705 |

FOREIGN PATENT DOCUMENTS 3740831  6/1989  Fed. Rep. of Germany ...... 210/705

Primary Examiner—Peter Hruskoci
Attorney, Agent, or Firm—Cushman, Darby, Cushman

[57] ABSTRACT

A method of recovering contaminants from suspension or solution in a liquor comprises the steps of forming a foam of the liquor, displacing said foam onto a drainage device to dry said foam and separate the liquor said contaminants being retained in the dried foam and the drained liquor being reduced in contaminant content.

10 Claims, 1 Drawing Sheet

REMOVAL OF CONTAMINANTS

This invention relates to the removal or recovery of contaminants such as metals or organic chemicals from solution or suspension.

With an increased emphasis on environmental safety and pollution control the efficient removal of contaminants from wastewater has became of vital importance to the manufacturing industry.

Metals, particularly heavy metals, are one of the insidious pollutants of our environment. They are not biodegradable and may exist in a number of forms associated with living organisms, water, sediments and suspended matter. The heavy metals accumulate in sediments and are subsequently taken up by organisms. With the process of bio-accumulation through the food chain many edible species of aquatic life are affected to the extent that their consumption may be hazardous.

Also the removal of oils and other organic chemical residues from waste water streams is critical to efficient pollution control.

The most widely used method of treatment of waste water containing heavy metals is by precipitation and sedimentation. Although this treatment method can, when operating at peak efficiency, give an effluent containing less than 1 ppm of each heavy metal, under normal operating conditions it often exceeds the limit (e.g. 10 ppm) for disposal to sewer set by Trade Waste Laws. The reasons for this range from bad maintenance routine to the presence of interfering substances such as oils.

Sedimentation is a slow process requiring large settling volumes.

The conventional process is also subject to number of interferences which can effect the rate of settling—particularly if the system uses NaOH for neutralization. Even well operated clarifiers can have 5 to 50 ppm of suspended solids in the overflow. Contaminants, such as oils and substances which produce gases, are the most common source of problems since they interfere with the sedimentation process by increasing the buoyancy of the particles.

The flocculants used to speed up the sedimentation process in conventional technology are almost exclusively organic polyelectrolytes. These are expensive and require a certain degree of mixing before clarification is attempted. Depending on the size of the clarifier used, a separate mixing zone may be required in the process. The polyelectrolytes also add to the volume of sludge generated.

The polymer flocculants often required pH values of 9 to 10 for peak performance. Although these pH values are acceptable for disposal to sewer (max. pH=10) a considerable expense is incurred in raising the pH to this level.

The conventional technique of precipitation results in gelatinous precipitate that, even after flocculation and sedimentation yields a wet bulky sludge (95% water) that requires disposal. One of the most promising methods of separation and concentration of metal ions and fine particles is adsorbing colloid flotation.

Adsorbing colloid flotation has a number of attractive features (i) low energy requirements (ii) high removal efficiency (iii) reasonable capital requirements and (iv) comparatively low maintenance and operating costs, thereby potentially providing a low cost method of heavy metals recovery from industrial wastewaters.

The process generally involves the production of a hydroxide precipitate of the metal ions via pH adjustment by adsorption and/or co-precipitation with a floc generating material such as $Fe(OH)_3$ or $Al(OH)_3$, rendering the floc hydrophobic by adsorption of a surfactant and its subsequent removal by flotation with air bubbles.

Batch flotation yield high levels of metal removal for most ion combinations but with a time requirement of up to 10 minutes. Similarly laboratory studies of copper recovery using iron hydroxide as the adsorbing colloid and sodium lauryl sulphate as the frother required about 25 minutes but achieved levels in the effluent consistently less than 1 ppm. Most studies of heavy metal removal using these techniques have been carried out on simulated wastewaters made up from pure components.

Two studies on actual industrial effluents were based on copper removal from a copper smelter wastewater and chromium removal from an eletroplating effluent. Again flotation times of about 5 minutes were required to achieve residual levels less than 1 ppm.

It is an object of this invention to provide an efficient means of removing or recovering contaminants from suspension or solution which also lends itself to small scale economic operation.

To this end the present invention provides a method of recovering contaminants from suspension or solution in a liquor which comprises the steps of forming a foam of the liquor, displacing said foam onto a drainage device to dry said foam, and separate the liquor said contaminants being retained in the dried foam and the drained liquor being reduced in contaminant content.

In contrast to conventional froth flotation the present invention produces a foam which carries the majority of the liquor, with it over the top of the foaming tank onto a drainage device. The foam flows over the drainage device and dries, that is it is dewatered by drainage resulting in separation of the liquor from the foam. The dried foam may then be collected and disposed of. The liquor reduced in contaminant levels is collected from the drainage device.

Accordingly in a preferred embodiment of the invention we provide a method of recovering waste water contaminants from a liquor such as waste water comprising the following steps:

feeding the liquor into a tank; forming a foam by passing gas through the liquor such that greater than 50% by volume of the liquor fed into the tank is displaced by overflow from the tank in the form of a foam; draining the foam; and collecting the liquor drained from the foam said liquor having reduced contaminant levels.

Generally we have found a continuous process whereby liquor is continuously fed into the tank and foam continuously formed is most preferred although a batch process may be used if desired. Preferably at least 80% by volume of the liquor is displaced by overflow in the form of a foam and more preferably at least 95% by volume.

Typically we have found that excellent results are achieved by displacing essentially all of the liquor via the overflow in the form of foam.

This invention generally achieves much faster throughput and lower resistance times in the foaming tank with a consequent saving in plant size.

The foaming step in the process of the invention is generally carried out on the liquor in the presence of a collecting colloid and surfactant.

The degree of removal of the contaminant is partly predicated on the choice of collecting (or adsorbing) colloid. Typically the adsorbing colloid is a metal hydroxide or metal sulphate of low water solubility and preferred adsorbing colloids are generally selected from hydroxides and sulfates of iron and aluminium and mixtures thereof. Preferred adsorbing colloids are $Fe(OH)_3$, $Fe(OH)_2$ and $Al(OH)_3$ particularly in the case of heavy metal contaminants.

The level of adsorbing colloid is typically in the range of from 1 to 1000 ppm and preferably in the range of from 5 to 500 ppm.

Most preferably the adsorbing colloid comprises a mixture of $Al(OH)_3$ and one or both of $Fe(OH)_3$ and $Fe(OH)_2$ which is preferably in a molar ratio in the range of from 5:1 to 1:5 and most preferably in the range of Al to Fe of from 1;1 to 1:4.

It will be appreciated that the absorbing colloid may be formed in situ under the appropriate conditions. Preferably the surfactants used are selected to provide a persistent, rigid, elastic foam. It is desirable that the foam persists for a sufficient period to allow efficient draining of the liquor from the foam and good retention of contaminants. Typically the foam will persist for at least 30 minutes without collapsing and preferably at least 2 hours at ambient temperature and pressure. Most preferably the foam persists until it is dry. A foam having rigidity means it is unlikely to collapse while rising in the foaming tank or moving on the drainage device. Elasticity of the foam allows it to move out of the tank and over the drainage device.

A variety of soaps and metal salts of fatty acids or sulphuric acid ester salts can be used to achieve foams of this kind.

Preferably the surfactant comprises a mixture of at least one metal salts of a fatty acid or $C_6$ to $C_{18}$ aliphatic alcohol and at least one metal salt of a fatty alkyl sulfate.

The level of surfactant is preferably in the range of from 5 to 5000 ppm and preferably from 10 to 500 ppm of liquor.

Preferably the molar ratio of fatty acid salt to fatty alkyl sulphate is in the range of from 1:1 to 1:4.

A particularly preferred surfactant component comprises a lauryl sulphate salt such as sodium lauryl sulfate in combination with an acid salt when the acid is selected from oleic, lauric and hexanoic acid. We have found a mixture of from 15 to 200 ppm sodium laurate and from 30 to 200 ppm sodium lauryl sulphate to be particularly effective.

Preferably the weight ratio of one part sodium laurate to two parts sodium lauryl sulfate and preferably 40 ppm of sodium laurate and 80 ppm of sodium lauryl sulfate is used. Another mixture of interest is sodium oleate and sodium lauryl sulfate.

Where gas is used in the formation of foam any suitable gas may be used. Air is preferred on economic grounds however nitrogen may be of particular use where it is desired to minimise oxidation of metal.

In order to maximise the efficiency of the process it is preferred that shorter residence times be used. Shorter residence times are a result of the increase in the volume of liquor and entraining air relative to each other and relative to the volume of the foaming tank. By increasing the volume flow rate of the liquor and of the foaming gas relative to the volume of the tank residence times are reduced. By maintaining residence times preferably below 2 minutes and the volume ratio of air to water above 5:1 (preferably above 5:2) efficient throughput can be achieved with a high proportion, preferably all, of the liquors being entrained in the foam which overflows from the tank onto the drainage device. Volume ratios of air to water in the range of from 5:1 (preferably 5:2) to 5:3 are generally convenient.

The optimum throughput of liquor may be determined without undue experimentation having regard to the method described herein. The throughput in the foaming tank may conveniently be measured in terms of hydraulic loading which may be, for example, greater than 15 $m^3/m^2h$ and preferably in the range of 15 to 35 $m^3/m^2h$. We have found that the process operates particularly efficiently with hydraulic loading of about 22 $m^3/m^3h$ although the process of invention may be operated using a wide range of hydraulic loadings.

The required gas flow rate for a given system may be determined having regard to the need for efficient foaming and may depend on various factors such as the surfactant choice. We have typically used gas flow rates of at least 25 $Nm^3/m^2h$, for example in the range of from 30 to 70 $Nm^3/m^2h$.

Preferably in the method of the invention the foam will be allowed to drain so that at least 95% by volume of the liquor is recovered from the foam.

The nature of the drainage device is not narrowly critical but will be dictated by its function of providing drainage of liquor while allowing the foam to remain intact. The drainage device may comprise racks or trays which allow the foam to progressively move under force of gravity and/or by the urging of newly created foam.

To reduce the space required drainage trays or racks may be stacked such that foam is progressively transferred to a lower level as it dries.

Generally it is convenient to allow the foam to dry under ambient temperature and pressure, however variation of temperature, pressure or gas currents may be used to quicken drying if desired.

Examples of contaminants which may be collected using the method of the invention include: metals including aluminium and heavy metals, being metals of atomic number of at least 21, such as Titanium Chromium, Manganese, Cobalt, Nickel, Copper, Zinc, Yttrium Zirconium, Molybdenum, Antimony, Tungsten Palladium, Silver, Cadmium, Tin, Mercury, Lead and Uranium; and organic chemicals such as synthetic and natural oils.

The process of the invention has been found to be particularly suited to removal of metals such as Aluminium, Chromium, Nickel, Copper, Zinc, Antimony, Lead and Mercury. Such metals may be in the form of the elemental metal or its compounds or ions. The organic chemical most suited to removal by the process of the invention generally have a low water solubility for example, a water solubility of less than 10 mg per liter.

In the case of heavy metal contaminants the method of the invention generally provides at least 95% by weight retention of heavy metals in the foam. The level of contaminants in the liquor prior to treatment may be for example, in the range of from 0.1 parts per billion to 5000 parts per million.

It will be understood that levels of contaminants may be reduced by several passes through apparatus operating in accordance with the method of the invention or by using two or more such apparatus in sequence.

The process of the invention may also be used in combination with conventional methods such as precipitation.

The theory of the foam collection is as follows. It is well known that for a material to be removed by flotation it must form a stable three phase contact at the interfacial region created by the separate solid/liquid S/L, solid/gas S/G and liquid/gas L/G interfaces. The three corresponding interfacial free energies are related to the contact angle, measured through the liquid phase, by Young's equation.

$$\gamma_{S/G} - \gamma_{S/L} = \gamma_{L/G} \gamma \cos \theta$$

For the material to adhere to the bubble, the work of adhesion places a requirement on these relative values such that $$\gamma_{L/G} > \gamma_{S/G} - \gamma_{L/G}$$

For hydrophilic materials, such as most mineral ores, hydrated oxides and hydroxides, a surface active molecule is adsorbed onto the surface to given a sufficient value to $\theta$.

Bleier (1977) has shown that the property that determines ultimately whether a bubble and a particle heterocoalesce is this relative hydrophobicity of the solid's surface.

Both processes of co-precipitation with the adsorbing colloid $(Fe(OH)_3)$ and adsorption on to the colloid appear important in scavenging metal ions from solution. Chatman et al (1977) showed that the removal of CuII was predominantly by a co-operation route. While Haug (1982) has shown that CrVI may not only be adsorbed onto the foaming $Fe(OH)_3$ surface but also be mixed inside the $Fe(OH)_3$ precipitated by an inclusion mechanism.

BRIEF DESCRIPTION OF THE DRAWINGS

The invention will now be further described with reference to the attached drawing. In the drawing

Figure 1:
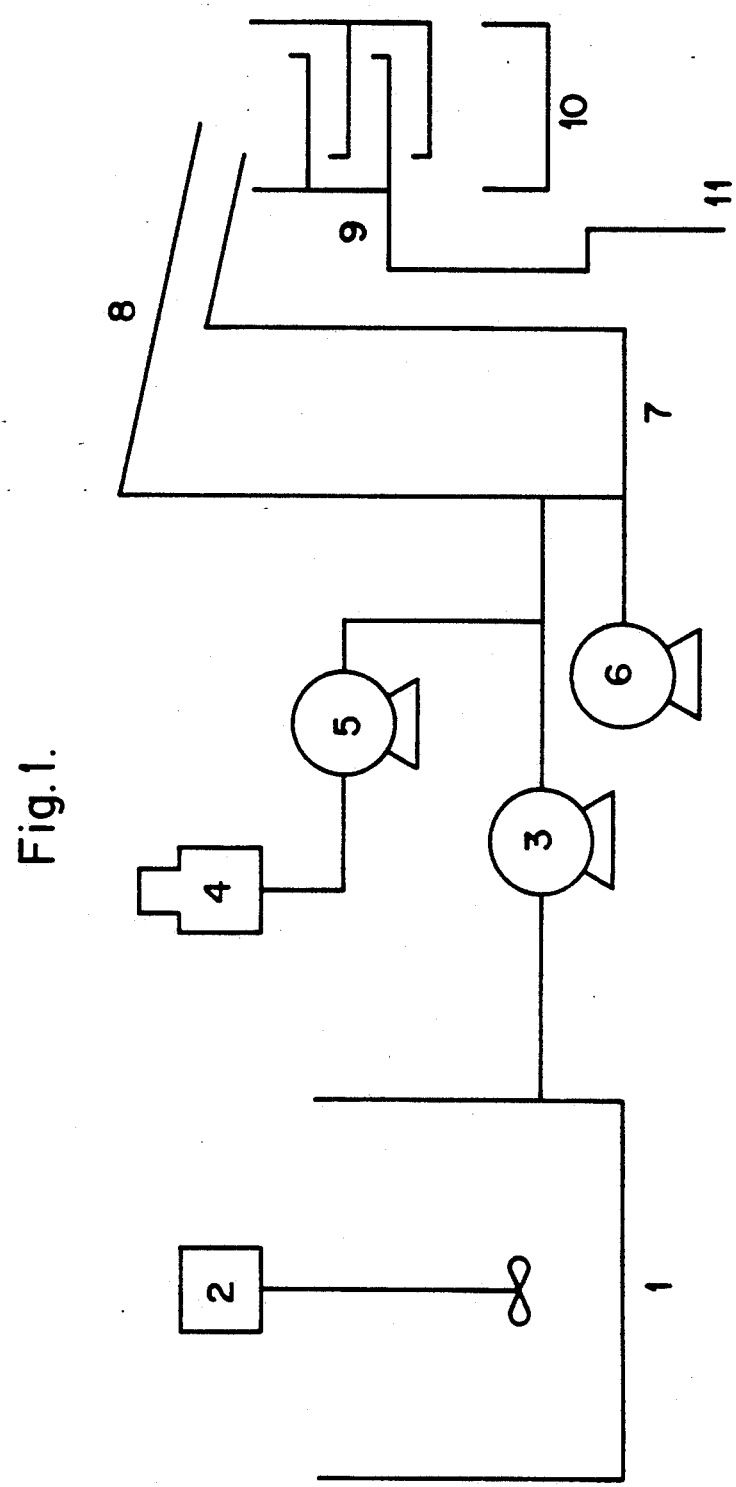
FIG. 1 is a schematic plan of a treatment plant adapted to treat waste water in accordance with this invention.

During operation of the plant wastewater to be treated is introduced to the holding or pretreatment tank 1 where stirrer 2 mixes the waste water to provide an even consistency. Wastewater is continuously fed into the foaming tank 7 by pump 3 and surfactant is continuously pumped by pump 5 into the wastewater prior to the wastewater entering the foaming tank. Foam is continuously produced from the wastewater in the tank 7 by air introduced by pump 6 at or adjacent the bottom of the tank 7 and overflows from the tank 7 via overflow conduit 8 onto stacked drainage trays 9. Foam drains as it passes over the trays under the action of gravity and the urging of newly created foam and dried foam is collected in bin 10.

Drained liquor is recovered via conduit 11 for further treatment or safe disposal.

The invention will now be demonstrated by, but is in no way limited to, the following Examples:

EXAMPLE 1

A laboratory scale plant of the design described above with reference to FIG. 1 was used to separate heavy metals from effluent from an electroplating installation.

The samples were all chromium stream samples which had already been treated with metabisulfite at pH3 to reduce Cr VI to Cr III.

The level of heavy metals in these samples was in the following ranges:
Cr: 50-100 ppm
Ni: 20-70 ppm
Zn: 1-3 ppm The extent of chromium reduction in each sample was determined by potentiometric titration.

A wide range of degrees of metabisulfite reduction was found to occur under normal circumstances i.e. some samples were found to contain large excesses of unreacted metabisulfite while others were found to contain considerable quantities of hexavalent chromium. (This is an indication of poor ORP probe maintenance). To ensure reproducibility between runs it was necessary to either add metabisulfite, in the samples where chromium VI was present, or to remove metabisulfite, in samples where excess metabisulfite was present, by adding hydrogen peroxide. In both cases, reactants were added such that the final level of metabisulfite was approximately $1 \times 10^{-4}$ mole/liter $SO_3^=$.

25 liter batches of the wastewater were made 25 ppm wrt $Fe^{3+}$. The pH was then increased to 8.0 by adding NaOH. The wastewater was then pumped to the flotation cell. The surfactant mixture was added in the lines just prior to entry into the flotation cell. (see FIG. 1).

A foam was generated by passing air through a porous glass air diffuser at the bottom of the flotation cell.

The foam was collected in wide, shallow containers which allow dewatering and concentration of the foam product to 5% solids.

The effect the following parameters have on the heavy metal removal and on the foam product stability were studied:
feed flow rate
air flow rate
total surfactant concentration
column height
metabisulfite concentration The apparatus depicted in FIG. 1 (2 liter flotation cell capacity) was operated at a number of different feed flow rates, surfactant concentrations and air flow rates.

The treated effluent was sampled at regular intervals during each run and analysed for Cr, Ni and Zn by atomic absorption spectroscopy.

The maximum heavy metal removals achieved at the three highest feed flow rates are tabulated below. (Gas flow rate: 4.8 l/min, surfactant conc.: 100 ppm)

TABLE 1

| Maximum heavy metal removal and feed flow rate | | | | |
|---|---|---|---|---|
| Metal | Conc. of heavy metal in untreated effluent(ppm) | Conc. of heavy metal in treated effluent(ppm) | Removal % (average) | Feed flow rate (l/min) |
| Cr | 80.5 | 4.7 | 94 | 2.0 |
| Ni | 58.3 | 6.6 | 89 | 2.0 |
| Zn | 2.32 | 0.19 | 92 | 2.0 |
| Cr | 74.32 | 2.8 | 96 | 2.5 |
| Ni | 52.3 | 2.7 | 95 | 2.5 |
| Zn | 2.21 | 0.11 | 95 | 2.5 |
| Cr | 80.0 | 1.2 | 98 | 3.0 |
| Ni | 55.3 | 3.2 | 94 | 3.0 |
| Zn | 3.27 | 0.05 | 98 | 3.0 |

The process is able to meet the 10 ppm limit for the disposal of these metals to sewer at very high feed flow rates. (Residence times of 0.7 minutes in flotation cell).

The average small electroplating firm produces approximately 12,000 liters of wastewater per day. The semi-bench scale rig used above operated at 190 l/hr. Hence, in a 12 hour day this rig can treat 2,160 liters of water.

To treat 12,000 liters of wastewater in 12 hours the full scale treatment plant would have to be 12,000/2160=5.5 times larger i.e. a flotation cell volume of 5.5×2=11 liters would be sufficient.

The foam exiting the floatation column contains substantial quantities of water. Before this is disposed of, it must first be dewatered and concentrated.

Foam drainage rate experiments revealed that wide and shallow collection vessels (i.e. of high surface are to volume ratio) were the most effective in dewatering and concentrating the foam product by facilitating the drainage process. It was found that if the fresh wet foam was allowed to enter one end of a wide and shallow collection vessel, by the time the foam reached the other side of the collection vessels considerable dewatering and concentration had taken place.

Preliminary results with the 2 liter rig described above indicate that this mode of concentration of the foam product is extremely efficient. Using this equipment, run at 1 liter/min until steady state has been achieved (i.e. until the velocity of the foam front in the collection vessel trays was approximately zero) a collection vessel surface area of 0.3 m$^2$ was sufficient to achieve a foam product of 5% solids content.

To minimise the amount of floor space required for this process, a stack type arrangement of trays was devised in which the foam product can progressively overflow from higher trays to lower ones while draining, until the maximum solids content is achieved.

Table 2 illustrates the heavy metal removal for varying flow rates of effluent and air using as surfactant sodium laurate (NL) and sodium lauryl sulfate (NLS).

TABLE 2

| Percent heavy metal removal (foam drainage) Surfactant conc.: 40/80 (ppm NL/ppm NLS) | | | | |
|---|---|---|---|---|
| Effluent flow rate (ml/min) | Gas flow rate (ml/min) | Metal | | |
| | | Cr | Ni | Zn |
| 400 | 950 | 95 | 85 | 90 |
| 400 | 1400 | 95 | 82 | 92 |
| 400 | 1900 | 94 | 91 | 96 |
| 400 | 2300 | 97 | 91 | 98 |
| 600 | 2300 | 92 | 92 | 98 |
| 600 | 2750 | 98 | 94 | 96 |
| 1000 | 4500 | 97 | 94 | 95 |
| 1000 | 5000 | 95 | 93 | 94 |
| 1500 | 3600 | 97 | 93 | 99 |
| 1500 | 4500 | 99 | 92 | 99 |

The chemical consumption requirements for this process in relation to chromate removal are as follows.

Alkali: Both the conventional process and this invention being developed depend on the precipitation of the heavy metal with alkali. The pH at which the maximum removal of heavy metals is achieved depends on the solubilities of the heavy metal hydroxides and to some extent on which heavy metals are present. With the conventional process, although the pH for the maximum removal of the heavy metals may have been achieved, more alkali is added to raise the pH to the optimum pH for the flocculation stage (pH 9-10).

The flotation process, on the other hand may operate at pH 7.5-8.0 and hence does not need this additional use of alkali.

Acids: The chromic acid rinsed off freshly chrome plated items needs to be reduced to chromium III so that precipitation can occur. Both processes depend on this stage for good heavy metal removals.

This reduction is achieved by the addition of sodium metabisulfite (or SO$_2$) to the rinse water. This reaction is very slow at neutral pHs and hence large quantities of acid (usually sulfuric) are required to bring the pH down to a low enough pH to allow convenient residence times in treatment tanks to be achieved (pH 3).

This costly reduction stage at acidic pHs can be replaced with reduction at near neutral pHs with a sacrifical iron electrode. i.e.

$$Fe \rightarrow Fe^{2+}$$

$$3Fe^{2+} + CrO_4^= + 4H_2O \rightarrow 2Fe^{3+} + Cr^{3+} + 8OH^-$$

By using this mode of reduction substantial savings could be made.

The main reason for not adopting this mode of reduction with the flocculation and sedimentation process is that for every mole of chromate in the wastewater three mole of ferric ion are produced. Hence a greater quantity of wet sludge is generated with this mode of reduction. Reduction with a sacrificial iron electrode would be more suited to adsorbing colloid flotation since the foam product from this process can be inexpensively coverted to a dry powder and is hence less expensive to dispose of than a wet sludge from the flocculation and sedimentation process.

Surfactant or flocculant: The polymer flocculants used in conventional technology are used at a lower level than the surfactants in the flotation process (approximately 5 ppm for flocculants compared with approximately 60 ppm for the surfactants). This added expense associated with the use of surfactants would, however, be partially offset by the fact that the surfactants used are less expensive than polymer flocculants.

From the above it can be seen that the foam generation and drainage process of this invention overcomes some major problems associated with conventional heavy metal removal.

EXAMPLE 2

This Example demonstrates the use of the method of the invention in removal of organic chemical contaminants.

Wastewater containing 620 mg/l fibremakers spinning oil was foamed in accordance with the procedure of Example 1 using a batch process and the surfactant was present as 40 ppm sodium laurate and 80 ppm sodium lauryl sulfate.

The liquor drained from the foam contained 60 mg/l spinning oil.

EXAMPLE 3

This Example demonstrates the use of the invention in removal of mercury from the industrial waste water.

To waste water containing 25 ppm mercury was added surfactant to provide 100 ppm sodium laurate and 200 ppm sodium lauryl sulphate and aluminium nitrate and ferrous sulphate were welded to provide 100 ppm AlIII and 100 ppm FeII. The pH was adjusted to 8.5 by addition of NaOH.

The mixture was farmed according to the process of Example 1 using the apparatus of FIG. 1 and the liquor drained from the foam was found to comprise 11 parts per billion mercury.

EXAMPLE 4

This Example demonstrates the effect of pH on the method of the invention. The waste water mixture was prepared and treated as for Example 3 with the exception that the pH was altered by variation of the amount of NaOH added.

The efficiency of mercury removal at different pH's is tabulated below.

| pH | remaining Hg parts per billion | % Hg |
| --- | --- | --- |
| 6.0 | 30.7 | 0.123 |
| 7.0 | 25.9 | 0.104 |
| 7.5 | 20.5 | 0.082 |
| 8.0 | 18.2 | 0.073 |
| 8.5 | 11.0 | 0.044 |
| 9.0 | 7.9 | 0.032 |

EXAMPLE 5

This Example demonstrates the effect of variation of colloid concentration on mercury removal.

The process of Example 3 was repeated with varying concentration of AlIII and FeII.

The efficiency of removal of mercury at the varying adsorbing colloid concentrations is tabulated below.

| AlIII (ppm) | Fe'II (ppm) | remaining Hg parts per billion | % Hg |
| --- | --- | --- | --- |
| 100 | 100 | 11.0 | 0.044 |
| 150 | 50 | 1.05 | 0.042 |
| 175 | 25 | 17.2 | 0.069 |
| 50 | 150 | 7.6 | 0.030 |

EXAMPLE 6

The procedure of Example 3 was repeated using a waste water sample having a mercury concentration of 56 parts per billion and the removal of Hg using various adsorbing colloid concentrations is shown in the table below.

| AlIII ppm | FeII (ppm) | Remaining Hg (ppb) | % Hg |
| --- | --- | --- | --- |
| 100 | 100 | 0.7 | 1.25 |
| 150 | 50 | 0.5 | 0.89 |
| 50 | 150 | 0.0 | 0.00 |

We claim:

1. A method of recovering contaminants selected from the group consisting of aluminum, heavy metals, and organic chemicals from suspension or solution in a liquor which comprises feeding the liquor into a tank, forming a foam in said tank by passing gas through the liquor in the tank such that greater than 50% by volume of the liquid fed into the tank is displaced by overflow from the tank in the form of foam onto a drainge device, wherein the liquor is foamed in the presence of a surfactant mixture of at least one $C_6$ to $C_{18}$ aliphatic alcohol or salt of a fatty acid and at least one salt of a fatty alkyl sulphate, and an adsorbing colloid selected from Fe$(OH)_2$, and Al$(OH)_3$ and mixtures thereof, allowing the liquor in said foam to drain and the foam to dry on said device, contaminant being retained in the dry foam, and collecting the thus drained liquor with a reduced contaminant content.

2. A method of recovering contaminants according to claim 1 wherein liquor is continuously fed into the tank, and foam is formed by the continuous introduction of gas into the liquor.

3. A process according to claim 1 wherein at least 95% by volume of liquor fed into the tank is displaced by overflow from the tank in the form of foam.

4. A method of recovering contaminants according to claim 1 wherein the surfactant comprises a mixture of a fatty acid salt and fatty alkyl sulfate salt in a molar ratio of said acid to said sulphate in the range of from 1:1 to 1:4.

5. A method of recovering contaminants according to claim 1 wherein the surfactant is a mixture of sodium laurate and sodium lauryl sulfate present at a level in the range of from 5 to 1000 ppm.

6. A method of recovering contaminants according to claim 1 wherein the volume ratio of gas used in foaming to liquor fed into the tank is in the range of from 5:1 to 5:3.

7. A method of recovering contaminants according to claim 1 wherein the hydraulic loading of the foaming tank is in the range of from 15 to 35 $m^3/m^2h$ and the gas flow rate into the foaming tank is at least 25 $Nm^3/m^2h$.

8. A method of recovering contaminants according to claim 7 wherein the contaminants are heavy metals.

9. A method of recovering contaminants according to claim 1 wherein at least 95% by volume of liquor is recovered from the foam.

10. A method of recovering contaminants according to claim 1 wherein the contaminants comprise heavy metals and wherein the liquor drained from the foam contains less than 5% by weight of the contaminant level of the unfoamed liquor.

* * * * *